United States Patent [19]
Ichihashi et al.

[11] Patent Number: 5,115,722
[45] Date of Patent: May 26, 1992

[54] SOLENOID-OPERATED SELECTOR VALVE

[75] Inventors: Koji Ichihashi; Kyoji Tanaka, both of Saitama, Japan

[73] Assignee: Zexel Corporation, Tokyo, Japan

[21] Appl. No.: 695,431

[22] Filed: May 3, 1991

[30] Foreign Application Priority Data

May 11, 1990 [JP] Japan .................................. 2-19920

[51] Int. Cl.$^5$ ............................................. F15B 13/07
[52] U.S. Cl. ........................................ 91/512; 91/517; 137/596.17; 192/87.13; 192/87.18; 192/109 F
[58] Field of Search ................... 91/512, 517; 137/596.17; 192/87.13, 87.18, 109 F

[56] References Cited

U.S. PATENT DOCUMENTS

| | | | |
|---|---|---|---|
| 2,502,800 | 4/1950 | Resnick | 91/420 |
| 3,473,566 | 10/1969 | Peppel | 137/596.2 X |
| 4,172,582 | 10/1979 | Bobnar | 91/420 X |
| 4,597,557 | 7/1986 | Krieger et al. | 91/420 X |
| 4,667,570 | 5/1987 | Jensen et al. | 91/420 |

Primary Examiner—Gerald A. Michalsky
Attorney, Agent, or Firm—Nields & Lemack

[57] ABSTRACT

There is disclosed a solenoid-operated selector valve adapted for control of hydraulic clutches such as of a tractor. The selector valve has four ports and can assume two positions. The selector valve includes a spool having an axially extending hole. A piston and a sequence valve are held in this hole. The sequence valve can relieve the pressure. The hole is in communication with the outside of the spool via first through third radially extending holes. The pressure inside one cylinder port which is normally connected with the pump port is maintained constant even when the engaged clutch is being switched to the other. This pressure is not reduced down to zero until the pressure inside the other cylinder port reaches a predetermined pressure.

9 Claims, 4 Drawing Sheets

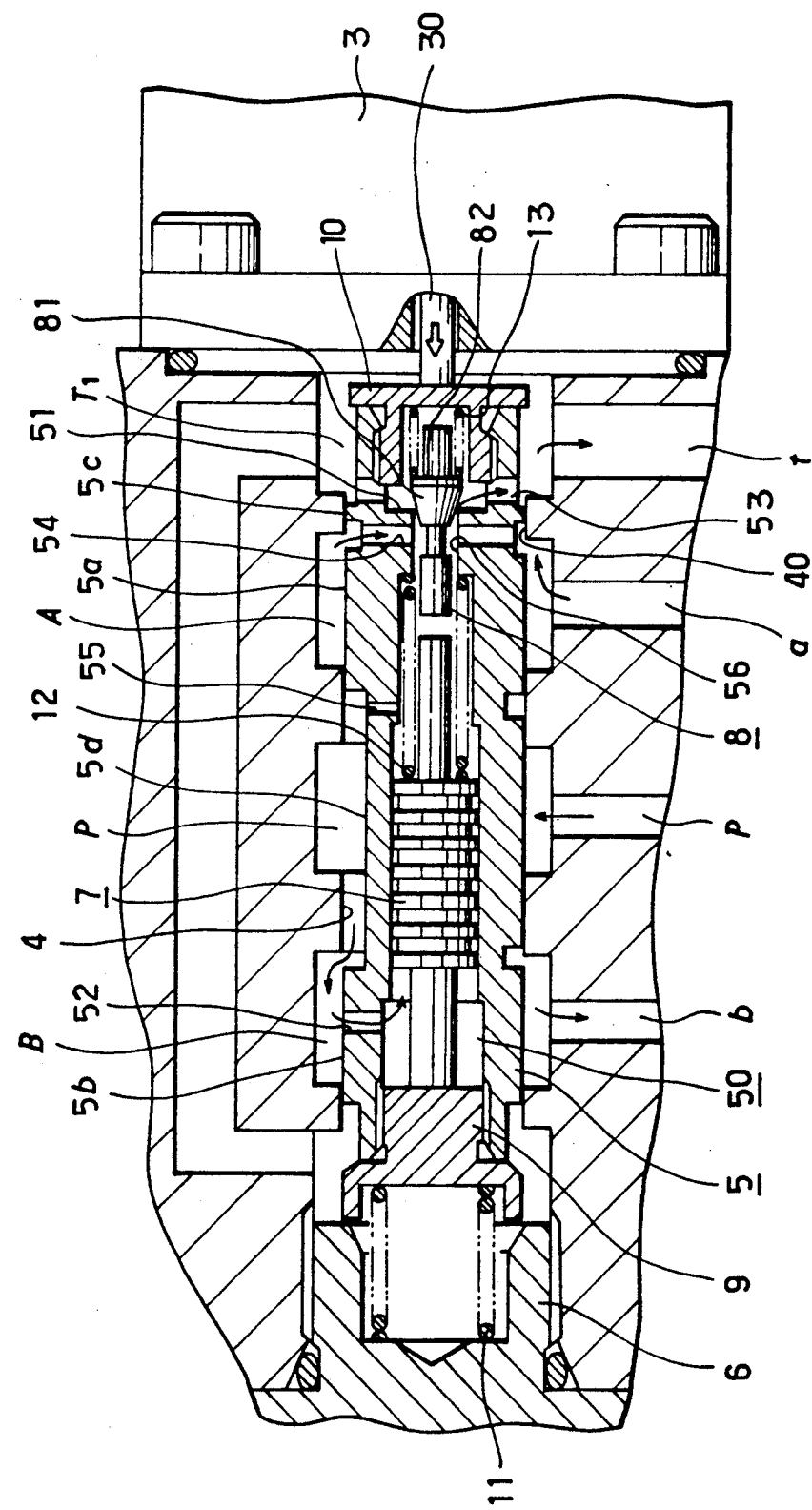
Fig.1-A

SOLENOID-OPERATED SELECTOR VALVE

FIELD OF THE INVENTION

The present invention relates to a solenoid-operated selector valve and, more particularly, to a soleniod-operated selector valve adapted for control of hydraulic clutches.

BACKGROUND OF THE INVENTION

Construction vehicles typified by tractors often adopt electronically controlled traveling equipment. Generally, such electronically controlled traveling equipment uses two clutches which are actuated by their respective hydraulic actuators for low-speed operation and high-speed operation, respectively. Hydraulic pressure is supplied to and discharged from these two actuators to selectively engage the clutches.

One example of such a hydraulic clutch system is shown on FIG. 4. This clutch system comprises clutch $C_1$ and $C_2$ adapted for low-speed operation and high-speed operation, respectively. These clutches $C_1$ and $C_2$ are engaged and disengaged by hydraulic actuators 31 and 32, respectively, which are equipped with springs 34 and 35, respectively, for biasing their respective clutches in the directions to disengage them. Each of the hydraulic actuators 31 and 32 consists of a single-acting type hydraulic cylinder.

A single solenoid-operated selector valve 37 which has four ports and can assume two positions is disposed so as to be surround by the hydraulic actuators 31, 32, and a hydraulic pump 38. The solenoid control portion of the valve 37 is energized and deenergized tio switch the oil passage between two channels communicating with the actuators 31 and 32, respectively.

In the past, a valve of simple construction has been used as the solenoid-operated selector valve 37. In particular, as shown in FIG. 4, when the solenoid control portion is not energized, connections P-A and B-T are made. When the control portion is energized, connections P-B and A-T are made. When oil under pressure is being supplied from the hydraulic pump 38 into the hydraulic actuator 31 of the low-speed clutch $C_1$ and the oil held in the hydraulic actuator 32 of the high-speed clutch $C_2$ is being returned into a tank 39, if the solenoid control portion of the selector valve 37 is engergized to switch the oil passage in the valve, for switching the clutch, then the oil inside the actuator 31 is quickly returned into the tank 39 via the route A-T. Thus, the low-speed clutch $C_1$ is immediately disengaged. However, the high-speed clutch $C_2$ is not engaged until the oil delivered from the pump 38 enters the narrowed oil chamber (the volume of this chamber is minimal at this time) on the side of the piston in the actuator 32, increases the pressure in this chamber, and the piston produces a given stroke.

This is because, in the prior art solenoid-operated selector valve 37, oil under pressure is supplied into the port B irrespective of the pressure inside the port A at the time of switching. Therefore, the two clutches are not exactly successively engaged because of the delay of operation described above. If the load applied when the vehicle is running is large, the speed of the vehicle is greatly reduced momentarily or the vehicle comes to a halt. Then, the high-speed clutch is engaged, so that the vehicle frequently starts violently.

One conceivable method of avoiding these undersirable phenomena consists in connecting a solenoid-operated proportional pressure-reducing valve between the ports A and B in FIG. 4 and controlling the changes in the pressures inside the ports A and B in accordance with a predetermined program. However, this method involves complicated control. In addition, the valve is made large and complex in structure. As a result, it is inevitable that the valve is expensive. For these reasons, this method has not been practical.

SUMMARY IF THE INVENTION

In view of the foregoing problems, it is an object of the invention to provide a solenoid-operated selector valve in which the engaged hydraulic actuator can be switched smoothly from one to the other and which suppresses a reduction in the speed or stoppage of the vehicle that would otherwise be caused when the engaged clutch is switched from the low-speed clutch to the high-speed clutch of a construction vehicle typified by a tractor, thereby permitting the engaged clutch to be smoothly switched from the low-speed clutch to the high-speed clutch.

The above object is achieved by a solenoid-operated selector valve capable of assuming two positions, said selector valve comprising: a pump port; a first cylinder port which is normally connected with the pump port, the pressure inside the cylinder port being maintained constant even when the engaged clutch is switched from one to the other; a second cylinder port; a tank port; a relief valve and a sequence valve which are so actuated that the first cylinder port is not completely connected with the tank port until the pressure inside the second cylinder port reaches a predetermined pressure, whereupon the pressure inside the first cylinder port is reduced down to zero.

This solenoid valve can take two positions and has the four ports. The solenoid valve is mounted so as to be suurounded by a hydraulic pump and two acturators. When the solenoid portion of the valve is not energized, connections P-A and B-T are made. When the soienoid portion is energized, connections P-B and A-T are made. The structure of this solenoid valve has the following features.

The body of the valve has a spool hole in which a spool is fitted so as to be slidable. The spool is provided with a hole extending axially. Both ends of the hole in the spool are closed off by plug members. A piston and a sequence valve are mounted on the same axis between the plug members at both ends. The piston and the sequence valve are biased by a first spring and a second spring, respectively, in such a way that the spacing between them is maintained constant.

The axially extending hole in the spool is in communication with the outside of the pistion via first, second, and third radially extending holes. The first radially extending hole is kept in communication with one cylinder port to force the hydraulic pressure from this cylinder port into the axially extending hole in the spool. This urges the piston toward the sequence valve against the action of the first spring. The second radially extending holes are maintained in communication with the tank port.

The third radially extending holes are close to the second radially extending holes and placed in communication with the tank port when the solenoid portion is not energized. When the solenoid portion is energized to move the spool, the hydraulic pressure is permitted to be supplied from the second cylinder port into the third radially extending holes. Then, the pressure opens the sequence valve against the force of the second spring that is weaker than that of the first spring.

The two cylinder ports formed in the spool hole are connected with the first and second hydraulic actuators, respectively. When the solenoid portion is not energized, the spool is returned by the force of a return spring in the same way as in an ordinary selector valve. Under this condition, a land disconnects one cylinder port B from the pump port. The oil delivered from the hydraulic pump flows into the other cylinder port A from the pump port, thus pushing up the piston of the first hydraulic actuator. At this time, the oil held in the second hydraulic actuator is forced back into the tank from the first cylinder port via the tank port. The pushing force acting on the piston from the first radially extending hole is almost zero and so the sequence valve is closed by the force of the second spring.

Under this condition the solenoid portion is energized to cause a push rod or the like to move the spool. The cylinder port which was connected with the tank port is placed in communication with the pump port. The other cylinder port that was in communication with the pump port is disconnected. The result is that the pressure oil is started to be supplied into the second hydraulic actuator.

The oil forced into the first cylinder port passes into the axially extending hole from the first radially exteding hole, pushing the piston. At this time, the force of the first spring still overcomes the pushing force and, therefore, the piston is not yet moved. The pressure oil which was held in the first hydraulic actuator at the time of the above-described switching passes into the axially extending hole from the second cylinder port through the third radially extending holes. This pushes the sequence valve in the direction to open it. If this pushing force overcomes the force preset for the second spring, then the sequence valve is opened. The pressure oil retained in the first hydraulic actuator begins to slowly flow out toward the tank port. Under this condition, the actuator is partially engaged.

Meanwhile, the pressure oil is kept supplied from the pump port into the first port. The pressure inside the second actuator increases. The pushing force acting on the piston from the first radially extending hole also increases, causing the piston to move against the present force of the first spring. Thus, the sequence valve is pushed by the piston opened fully. Hence, the second cylinder port is placed in full communication with the tank port.

The pressure oil held in the first actuator is quickly forced back into the tank. At this time, the second actuator has already passed through the stage of partial engagement, and the predetermined pressure has been reached.

Accordingly, in the present invention, when the destination of the supply of the pressure oil is switched from one hydraulic actuator to the other, the pressure in the cylinder port on the bleeding side is maintained constant without qucikly reducing the pressure. The bleeding can be completed after the pressure inside the cylinder port on the pressurizing side becomes sufficiently large. This permits the engaged actuator to be switched very smoothly between the two hydraulic actuators without delay. Furthermore, the system can be made inexpensive, because a special valve such as a solenoid proportional pressure-reducing valve is not required to be used.

Other objects and features of the invention will appear in the course of the description thereof which follows.

BRIEF DESCRIPTION OF THE DRWAINGS

FIG. 1 is a cross-sectional view of a solenoid-operated selector valve according to the invention, and in which the valve is not energized;

FIGS. 1-A and 1-B are views similar to FIG. 1, but showing different conditions successively assumed when the valve is energized;

DETAILED DESCRIPTION OF THE PREFERRED EMBODIMENT

Figure 2:
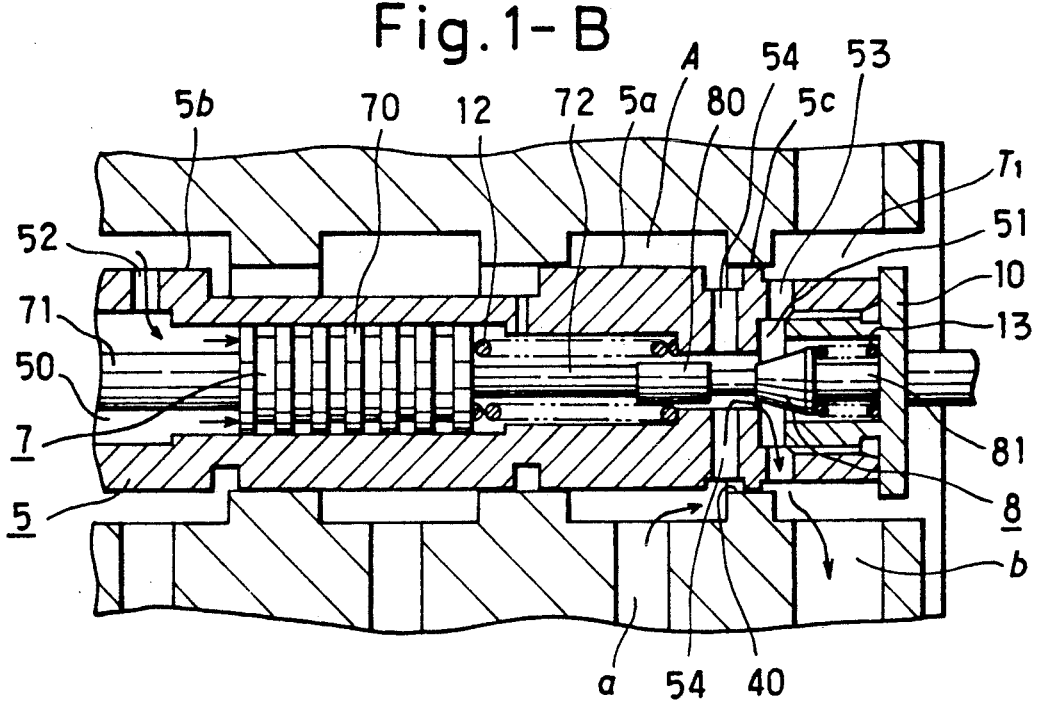
FIG. 2 is a hydraulic circuit diagram of a hydraulic clutch system according to the invention for switching the speed range of a construction machine.
Figure 2:
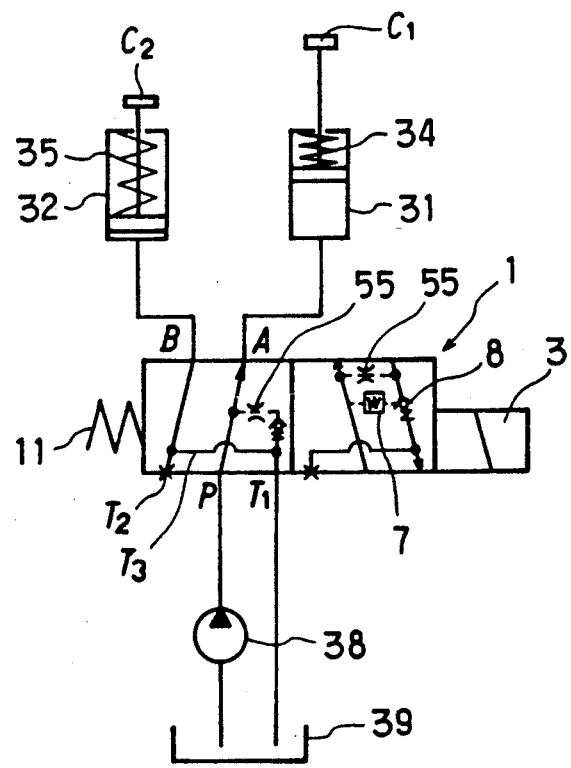
Figure 4:
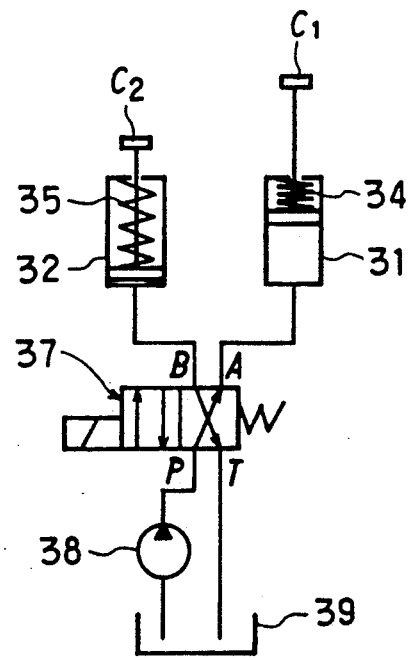
FIG. 4 is a hydraulic circuit diagram of the prior art solenoid-operated selector valve applied to a hydraulic clutch system for switching the speed range of a construction machine.

Referring to FIG. 2, there is shown a hydraulic circuit incorporating a solenoid-operated selector valve according to the invention. This hydraulic circuit is used to switch a construction vehicle such as a tractor between its high-speed clutch and low-speed clutch. This hydraulic circuit is similar to the prior art hydraulic circuit shown in FIG. 4 except for the solenoid-operated selector valve. That is, this hydraulic circuit has a low-speed clutch $C_1$, a high-speed clutch $C_2$, a first hydraulic actuator 31 for the low-speed clutch, and a second hydraulic actuator 32 for the high-speed clutch. These actuators each consist of a single-acting type hydraulic cylinder. Bias springs 34 and 35 are mounted in the first actuator 31 and the second actuator 32, respectively, to push back their respective pistons in such directions that the clutches are disengaged. The hydraulic circuit further includes a hydraulic pump 38 and a tank 39.

Figure 1:
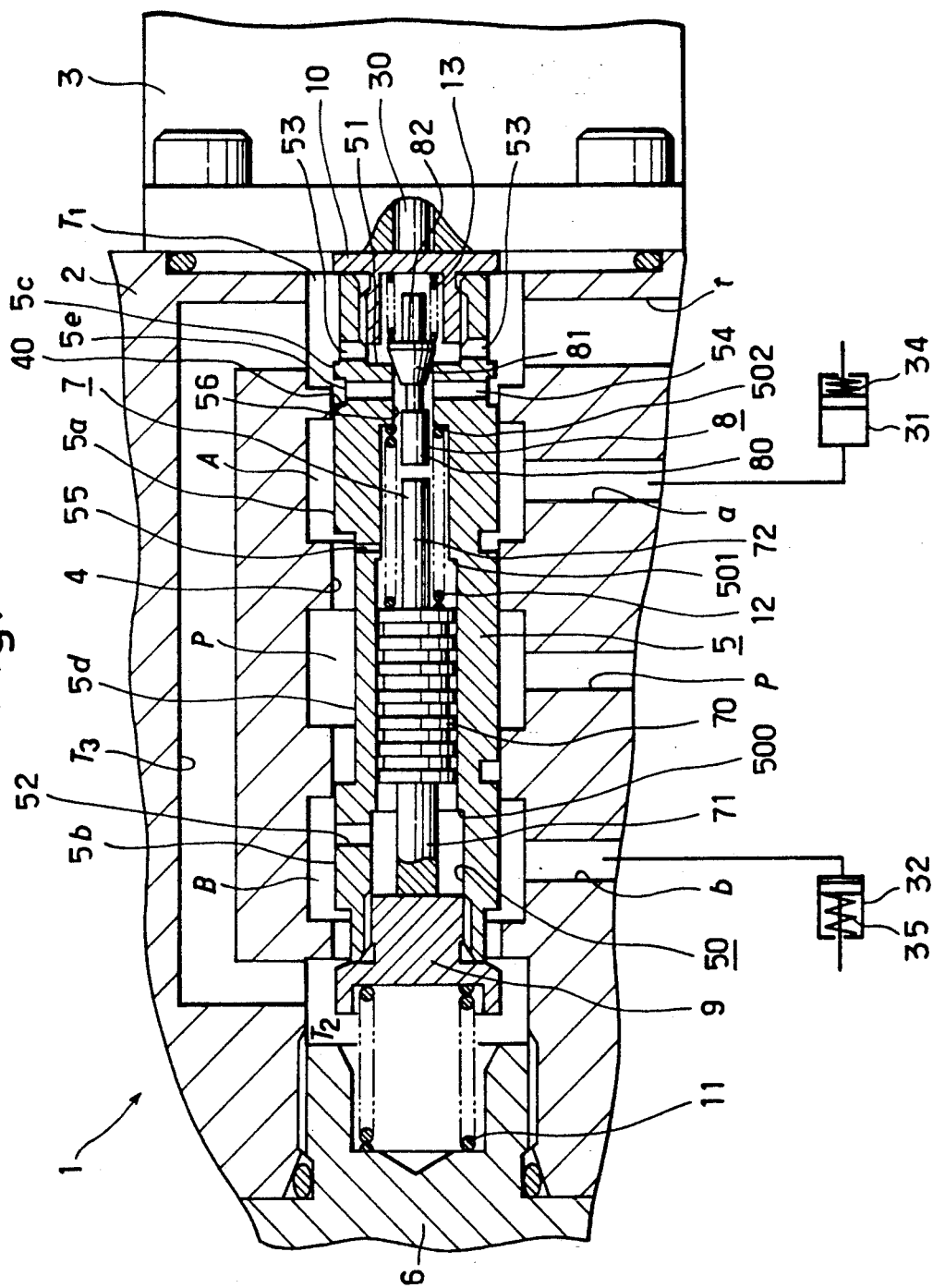

The solenoid-operated selector valve according to the invention is generally indicated by reference numeral 1. This valve 1 is particularly shown in FIGS. 1, 1-A, and 1-B. FIG. 1 shows normal condition of the valve, i.e., it is not energized. FIGS. 1-A and 1-B show conditions in which the valve is energized. The selector valve 1 has a valve housing 2 provided with a spool hole 4, a spool 5 slidably inserted in the hole 4, and a solenoid portion 3 mounted at one end of the housing 2. A piston 7 and a sequence valve 8 are located on the same axis inside the spool 5.

As shown in FIG. 1, the spool hole 4 extends through the valve housing 2. The left end of the hole 4 is closed off by a plug 6. A pump port P is formed in the center of the hole 4. A cylinder port A and another cylinder port B are formed on opposite sides of the pump port P. A tank $T_1$ is formed outside the cylinder port A. Another tank port $T_2$ is formed outside the cylinder port B. Of course, each port takes the form of an annular groove.

The pump port P is connected with the hydraulic pump 38 shown in FIG. 2 via a pump passage p. The right cylinder port A is connection with the chamber on the side of the piston in the hydraulic acuator 31 via a cylinder passage a. The left cylinder port B is connected with chamber on the side of the piston in the hydraulic actuator 32 via a cylinder passage b. The tank ports $T_1$ and $T_2$ are in communication with each other through a communication passage $T_3$ formed in the valve housing 2. This communication passage $T_3$ crosses none of the passage p, a, b. This right tank port $T_1$ is connected with the tank 39 by way of a tank passage t as shown in FIG. 2.

The spool 5 comprises a first land 5b for disconnecting the left cylinder port B from the pump port P, a second land 5a for disconnecting the right cylinder port A from the pump port P, a short rod portion 5e formed close to the second land 5a, and a third land 5c formed on the opposite side of the rod portion 5e from the second land 5a.

The position and the dimensions of the third land 5c are so determined that when the solenoid portion 3 is not energized, the thrid land 5c is located within the right tank port $T_1$ and that when the solenoid portion 3 is energized, the third land 5c is fitted inside wall 40 forming the spool hole between the right tank port $T_1$ and the right cylinder port A to disconnect these ports from each other. A complete or partially cutaway rod 5d as shown is formed between the first land 5b and the second land 5a.

The spool 5 is hollow cylindrical rather than solid, like an ordinary spool. Specifically, the spool 5 has an axially extending hole 50 provided with three steps 500, 501, and 502 which have successively decreasing diameters from the left end toward the right end. The final step 502 corresponds in position to the second land 5a. A thin hole 56 extends to the right from the center of the final step 502 and is in communication with an enlarged hole 51 formed at the right end of the spool.

The thin hole 56 and the enlarged hole 51 form parts of the axially extending hole 50. The bottom of the enlarged hole 51 just or almost reaches the position of the third land 5c. A plug member 9 acting also as a spring support is screwed into the left open end of the axially extending hole 50. Similarly, another plug member 10 serving also as a spring support is screwed into the open end of the enlarged hole 51.

A return spring 11 is disposed between the plug member 9 and the plug 6 to bias the spool 5 to the right, pressing the plug member 10 against the push member 30, such as a push rod, of the solenoid portion 3. Therefore, when the solenoid portion is not energized as shown in FIG. 1, the right cylinder port A is connected with the pump port P, and the left cylinder port B is connected with the tank port $T_2$. This tank port $T_2$ is placed in communication with the right port $T_1$ through the communcation passage $T_3$.

The aforementioned piston 7 is slidably inserted in the axially extending hole 50. The body of the piston 7 is indicated by numeral 70 and guided while in contact with the wall forming the intermediate portion of the hole 50. Two rod portions 71 and 72 extend horizontally from both ends of the body 70 of the piston and have a coaxial relation to the body 70. A first spring 12 is interposed between the right end of the body 70 of the piston and the innermost step 502 to bias the piston 7 to the left. The left rod portion 71 bears against the plug portion 9. Under this condition, the right rod portion 72 extends into the third hole.

The sequence valve 8 extends from the enlarged hole 51 into the third hole and comprises a rod portion 80, a conical tapering portion 81 continuous with the rod portion 80, and a spring support 82. A second spring 13 for relieving the pressure is mounted between the spring support 82 and the plug member 10 to seat the tapering portion 81 at the boundary between the enlarged hole and the thin hole 56. When the tapering portion is seated in this way, the rod portion 80 and the right rod portion 72 of the piston 7 are located on the same axis and spaced from each other by an approriate distance such that they face each other.

The spool 5 has a first radially extending hole 52, second radially extending holes 53, and third radially extending holes 54. The first hole 52 permits the oil forced out of the left cylinder port B to act on the piston 7. The first hole 52 is formed within the region of the first land 5b. This hole 52 extends from the first-stage hole in the axially extending hole 50 to the outer surface of the first land 5b, the first-stage hole being a chamber formed by the plug member 9 and the body 70 of the piston. Hence, the cylinder port B is kept in communication with the first-stage hole by the hole 52. Although the first radially extending hole 52 is single in the illustrated example, it is also possible to form plural radially extending holes 52.

The second radially extending holes 53 are formed in the rod region located to the right of the third land 5c of the spool 5 to maintain the enlarged hole 51 is communication with the right tank port $T_1$. Preferably, the second radially extending holes 53 are plural in number.

The third radially extending holes 54 act to open the sequence valve 8. Preferably, the holes 54 are plural in number. The third holes 54 are formed close to the second radially extending holes 53, i.e., in the rod 5e between the second land 5a and the third land 5c, and extends into the thin hole 56. When the solenoid portion is not energized, the third holes 54 are in communication with the tank port $T_1$. When the solenoid portion is energized, the third holes 54 are in communication with the cylinder port A.

Figure 3:
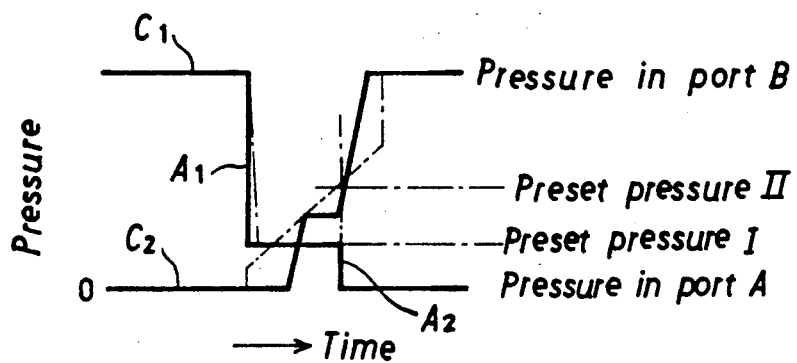
FIG. 3 is a graph showing the pressure waveforms obtained when the valve shown in FIG. 1 is energized.

The first spring 12 and the second spring 13 act to determine the degree of partial engagement. The first spring 12 produces a larger force than the force produced by the second spring 13. In particular, it is assumed that the first hydraulic actuator 31 can hold a pressure of, for example, 10 to 15 kg f/cm$^2$. The force of the first spring 12 is so set that when the solenoid portion 3 is energized to move the spool 5, thus permitting the piston 7 to be moved to the right if the pressure inside the cylinder port B reaches a preset pressure II shown in FIG. 3, for example, about 7 kg f/cm$^2$. The force of the second spring 13 is so set that when the solenoid portion 3 is energized to move the spool 5, the sequence valve 8 is opened if the pressure inside the cylinder port A reaches a preset pressure I shown in FIG. 3, for example, about 3 to 5 kg f/cm$^2$.

In the present example, an orifice 55 is formed in the region of the rod 5d corresponding in position to the right rod portion 72 of the piston 7, the orifice 55 being in communication with the axially extending hole 50. This introduces the pressure oil from the pump port P into the chamber on the pressurizing side in the body of the piston. Therefore, when the engaged actuator is switched, the pressure inside the cylinder port A is increased, so that the sequence valve 8 can be easily opened. This is adapted for the case in which the volume of the first hydraulic actuator 31 corresponding to the cylinder port A is small; otherwise the orifice 55 is not always required to be formed.

In the operation of the hydraulic circuit constructed as described above, when the solenoid portion 3 is not energized, the spool 5 is placed in the condition shown in FIGS. 1 and 2 by the force of the return spring 11. At this time, the left cylinder port B is disconnected from the pump port P by the first land 5b. The pressure oil delivered from the hydraulic pump 38 enters the pump port P, passes through the gap between the rod 5d and the spool hole 4, flows into the right cylinder port A, goes through the cylinder passage a, and is supplied into the first hydraulic actuator 31.

In this state, the coil (not shown) of the solenoid portion 3 is energized to attract the armature. The push member 30 is pushed against the plug member 10. This shifts the spool 5 to the left against the force of the return spring 11. As shown in FIG. 1-A, the right cylinder port A is disconnected from the pump port P by the second land 5a. The pump port P is placed in communication with the left cylinder port B. Consequently, the oil force out of the hydraulic pump 38 passes through the gap between the rod 5d and the spool hole 4, through the left cylinder port B and the cylinder passage b, and flows into the second hydraulic actuator 32.

At this time, a part of the pressure oil from the pump 38 flows into the axially extending hole 50 through the first radially extending hole 52, pushing the piston 7. However, the pressure inside the chamber on the side of the piston in the second actuator 32 is low. Therefore, in this stage, the force of the first spring 12 overcomes the hydraulic pressure produced by the pump 38. In consequence, the piston 7 does not move.

Meanwhile, the movement of the spool 5 causes the third land 5c to be fitted inside the spool hole wall 40 which disconnects the right cylinder port A from the tank port T$_1$. The third radially extending holes 54 are placed in communication with the cylinder port A. Thus, the oil forced out of the first hydraulic actuator 31 passes from the cylinder passage a through the cylinder port A as indicated by the arrow in FIG. 1-A, goes through the third radially extending holes 54, and flows into the thin hole 56. The hydraulic pressure forced into the thin hole 56 moves the sequence valve 8 away from the seat, i.e., the boundary between the enlarged hole 51 and the thin hole 56. As a result, the valve is opened.

The pressure oil delivered from the first hydraulic actuator 31 passes from the annular gap between the enlarged hole 51 and the tapering portion 81 into the second radially extending holes 53, and reaches the tank port T$_1$. Acccordingly, the pressure inside the right cylinder port A is reduced down to the preset pressure I created by the second spring 13 and then this pressure is maintained. This condition is indicated by the pressure line denoted by A$_1$ in FIG. 3. The low-speed clutch C$_1$ is partially engaged.

Under this condition, the biasing force of the second spring 13 acts from the side of the spring support 82 in the direction to open the valve and so the sequence valve 8 is not yet fully opened. Meanwhile, the pressure oil is kept supplied into the second hydraulic actuator 32 from the pump port P. The pressure inside the left cylinder port B increases. Hence, the pushing force acting on the piston 7 increases gradually.

When the pressure inside the left cylinder port B increases up to the presssure II preset for the first spring 12 in this way, the piston 7 shifts to the right as shown in FIG. 1-B. This causes the rod portion 72 located to the right of the piston 7 to bear against the rod portion 80 of the sequence valve 8, thus pushing the valve 8 in the direction to open it. As such, the sequence valve 8 is opened fully. Since the area of the oil passage is increased, the pressure remaining in the first actuator 31 drops quickly as indicated by the pressure line A$_2$ in FIG. 2. The pressure inside the right cylinder port A becomes null.

Therefore, the first hydraulic actuator 31 switches smoothly to disengaged state from partially engaged state. The second hydraulic actuator 32 smoothly switches to engaged state without delay. It is unlikely that the speed of the vehicle decreases suddenly or the vehicle comes to a stop when the engaged actuator is switched to the other actuator.

Although the novel solenoid-operated selector valve is adapted to be used as a selector valve for hydraulic clutches for different speed ranges, the invention is not limited to this. Rather, the invention can be applied to any control which is provided to switch the engaged hydraulic actuator to the other actuator without delay.

What is claimed is:

1. A solenoid-operated selector valve capable of assuming two positions and surround by a hydraulic pump and two actuators, said selector valve comprising:

a valve housing (1) provided with a spool hole (4);

a solenoid portion (3) mounted at one end of the valve housing (1);

a pump port (P) formed in the center of the spool hole (4);

a first cylinder port (A) which is formed on one side of the pump port (4) and which, when the solenoid portion (3) is not energized, is connected with the pump port (P), the cylinder port (A) being connected with the first hydraulic actuator (31);

a second cylinder port (B) which is formed on the other side of the pump port (P) and which, when the solenoid portion (3) is energized, is connected with the pump port (P), the second cylinder port (B) being connected with the second hydraulic actuator (32);

tank ports (T$_1$, T$_2$) which are formed on opposite sides of the cylinder ports (A, B) and which, when the solenoid portion (3) is not energized, are connected with the second cylinder port (B) and which, when the solenoid portion (3) is energized, are connected with the first cylinder port (A);

a spool (5) slidably inserted in the spool hole (4);

an axially extending hole (50) formed in the spool (5), both ends of the hole (50) being closed off by plug members (9, 10);

a piston (7) and a sequence valve (8) which are disposed on the same axis within the axially extending hole (50) and biased away from each other by a first spring (12) and a second spring (13), respectively, such that given spacing is maintained between them;

the axially extending hole (50) being in communication with the outside of the piston via a first radially extending hole (52), second radially extending holes (53), and third radially extending holes (54), the first radially extending hole (52) being kept in communication with the second cylinder port (B), the first radially extending hole (52) acting to guide hydraulic pressure from the second cylinder port (B) into the axially extending hole (50), for moving the piston (7) toward the sequence valve against the action of the first spring (12), the second radially extending holes (53) being kept in communication with the tank port (T$_1$), the third radially extending hole (54) being formed close to the second radially extending holes (53);

and wherein, when the solenoid portion (3) is not energized, the third radially extending holes (54) are connected with the tank port (T₁) and, when the solenoid portion (3) is energized to move the spool (5), the third radially extending holes (54) guide hydraulic pressure from the first cylinder port (A) to open the sequence valve (8) against the action of the second spring (13) which is weaker than the first spring (12).

2. The solenoid-operated selector valve of claim 1, wherein the solenoid-operated selector valve is used to control a low-speed range clutch and a high-speed range clutch, the first hydraulic actuator (31) being a cylinder for said low-speed range clutch, the second hydraulic actuator (32) being a cylinder for said high-speed range clutch.

3. The solenoid-operated selector valve of claim 1, wherein said spool (5) comprises a first land (5b) for disconnecting the left cylinder port (B) from the pump port (P), a second land (5a) for disconnecting the right cylinder port (A) from the pump port (P), and a third land (5c) formed on the opposite side of a short rod portion (5e) that is close to the second land (5a), and wherein when the solenoid portion (3) is not energized, the third land (5c) is placed within the right tank port (T₁) and when the solenoid portion (3) is energized, the third land (5c) disconnects the right tank port (T₁) from the right cylinder port (A).

4. The solenoid-operated selector valve of claim 1, wherein
(i) said first radially extending hole (52) is formed in the region of the first land (5b);
(ii) said second radially extending holes (53) are formed in the rod region located to the right of the third land (5c) of the spool (5); and
(iii) said third radially extending holes (54) are formed in the rod (5e) between the second land (5a) and the third land (5c).

5. The solenoid-operated selector value of claim 1, wherein
(i) said axially extending hole (50) has three steps (500, 501, 502);
(ii) a thin hole (56) extends from the center of the final step (502) to the right and is in communication with an enlarged hole (51) extending to the right end of the spool;
(iii) plug members (9, 10) acting also as spring supports are screwed into the opening at the left end of the axially extending hole (50) and the opening of the enlarged hole (51), respectively, the plug member (9) being biased by a return spring (11), the plug member (10) bearing against a push member (30) of the solenoid portion (3).

6. The solenoid-operated selector valve of claim 1, wherein said piston (7) comprises a piston body (70) that is guided while in contact with the intermediate portion of the wall forming the axially extending hole and rod portions (71, 72) extending horizontally from the ends of the piston body (70), and wherein the first spring (12) mounted between the right end of the piston body (70) and the innermost step (502) biases the piston (7) such that the rod portion (71) bears against the plug portion (9).

7. The solenoid-operated selector valve of claim 1, wherein said sequence valve (8) comprises a rod portion (80), a conical tapering portion (81) continuous with the rod portion (80), and a spring support (82), and wherein the second spring (13) is mounted between the spring support (82) and the plug member (10) to seat the tapering portion (81) such that the rod portion (80) and the rod portion (72) of the piston (7) are disposed opposite to each other on the same axis with given spacing therebetween.

8. The solenoid-operated selector valve of claim 1, wherein the spring force of said first spring (12) is so set that, when the solenoid portion (3) is energized to move the spool (5) and the pressure inside the cylinder port (B) reaches a predetermined pressure, the piston (7) is moved to the right, and wherein the spring force of said second spring (13) is so set that, when the solenoid portion (3) is energized to move the spool (5) and the pressure inside the cylinder port (A) reaches a predetermined pressure lower than the first-mentioned pressure set for the cylinder port (B), the sequence valve (8) is opened.

9. The solenoid-operated selector valve of claim 1, wherein said spool (5) has an orifice (55) in a region corresponding in position to the right rod portion (72) of the piston (7), and wherein the orifice (55) is in communication with the axially extending hole (50) in the rod (5d).

* * * * *